US006769252B2

(12) United States Patent
Smith

(10) Patent No.: US 6,769,252 B2
(45) Date of Patent: Aug. 3, 2004

(54) FLUID SYSTEM HAVING VARIABLE PRESSURE RELIEF

(75) Inventor: David P. Smith, Joliet, IL (US)

(73) Assignee: Caterpillar Inc, Peoria, IL (US)

( * ) Notice: Subject to any disclaimer, the term of this patent is extended or adjusted under 35 U.S.C. 154(b) by 24 days.

(21) Appl. No.: 10/016,531

(22) Filed: Dec. 10, 2001

(65) Prior Publication Data

US 2003/0106315 A1 Jun. 12, 2003

(51) Int. Cl.[7] .................................... F16D 31/02

(52) U.S. Cl. .................................... 60/468; 60/456

(58) Field of Search .................... 60/456, 468; 91/387; 251/30.01; 137/495

(56) References Cited

U.S. PATENT DOCUMENTS

| | | | | |
|---|---|---|---|---|
| 2,267,284 | A | * 12/1941 | Livers | 60/468 |
| 2,755,058 | A | 7/1956 | Margrave | |
| 3,010,691 | A | 11/1961 | Canfield | |
| 3,114,532 | A | * 12/1963 | Gray et al. | 251/30.01 |
| 3,458,769 | A | 7/1969 | Stampfli | |
| 3,632,080 | A | 1/1972 | King | |
| 3,645,836 | A | 2/1972 | Schexnayder | |
| 3,684,238 | A | 8/1972 | Michellone et al. | |
| 4,585,206 | A | 4/1986 | Itoh | |
| 4,739,795 | A | 4/1988 | Ewbank et al. | |
| 4,750,704 | A | 6/1988 | Brundage | |
| 4,848,721 | A | 7/1989 | Chudakov | |
| 4,893,645 | A | 1/1990 | Augustinas et al. | |
| 4,981,280 | A | 1/1991 | Brandenberg | |
| 5,046,530 | A | 9/1991 | Gossner et al. | |
| 5,069,420 | A | 12/1991 | Stobbs et al. | |
| 5,137,254 | A | 8/1992 | Aardema et al. | |
| 5,144,983 | A | 9/1992 | Schweim | |
| 5,176,358 | A | 1/1993 | Bonne et al. | |
| 5,263,514 | A | 11/1993 | Reeves | |
| 5,375,623 | A | 12/1994 | Weber | |
| 5,421,545 | A | 6/1995 | Schexnayder | |
| 5,592,972 | A | 1/1997 | Niethammer | |
| 5,607,137 | A | 3/1997 | Kanda et al. | |
| 5,645,263 | A | 7/1997 | Aardema | |
| 5,676,342 | A | 10/1997 | Otto et al. | |
| 5,709,368 | A | 1/1998 | Hajek, Jr. | |
| 5,791,628 | A | 8/1998 | Wolff et al. | |
| 5,868,059 | A | 2/1999 | Smith | |
| 5,884,850 | A | 3/1999 | Norgauer | |
| 5,911,245 | A | 6/1999 | Weber | |
| 5,913,577 | A | 6/1999 | Armdt | |
| 5,918,635 | A | 7/1999 | Wang et al. | |
| 6,021,997 | A | 2/2000 | Hell | |
| 6,145,312 | A | * 11/2000 | Hauser et al. | 60/464 |

FOREIGN PATENT DOCUMENTS

| | | |
|---|---|---|
| DE | 3306317 A1 | 8/1984 |
| GB | 2 065 929 A | 7/1981 |
| GB | 2 103 390 A | 2/1983 |
| JP | 57-65475 | 4/1982 |

* cited by examiner

*Primary Examiner*—F. Daniel Lopez
(74) *Attorney, Agent, or Firm*—Steve M Hanley; D James Barnes; J W Burrows

(57) ABSTRACT

A fluid control system includes a pressure supply and a valve arrangement having an inlet and an outlet and being in fluid communication with the pressure supply. The valve arrangement includes a relief operator configured to provide fluid communication between the inlet and the outlet of the valve arrangement in response to a predetermined pressure condition at said inlet. The valve arrangement is configured to provide fluid communication between the inlet and the outlet of the valve arrangement in response to an outlet pressure being greater than an inlet pressure.

22 Claims, 5 Drawing Sheets

FLUID SYSTEM HAVING VARIABLE PRESSURE RELIEF

DESCRIPTION

1. Technical Field

The present invention relates to fluid systems including electrically operated flow control valve arrangements for use in closed loop systems for pressure relief and fluid make-up.

2. Background

A typical hydraulic system provided with pressure relief may include a solenoid operated check valve with variable relief. Such hydraulic systems may be devised to control the output of a working device such as speed control of a cooling fan, for example. It is known to incorporate at least one valve into the system to prevent overpressure, such as, a relief valve for "load lock" (e.g., freezing or locking of the working device). An additional valve has been provided to the hydraulic system for fluid make-up to prevent cavitation damages to the hydraulic system, especially the working device. Cavitation occurs when, for example, the supply pressure becomes less than the discharge pressure resulting in gas formation within the working device. Furthermore it is often necessary to employ an additional valve to a signal circuit of the hydraulic system to compensate for varying signal pressure. The cost to provide the additional valves and controls, in addition to the labor associated with installation, is significant.

SUMMARY OF THE INVENTION

An embodiment of the present invention provides a fluid control system including a pressure supply and a valve arrangement including an inlet and an outlet and being in fluid communication with the pressure supply. The valve arrangement includes a relief operator being configured to provide fluid communication between the inlet and the outlet of the valve arrangement in response to a predetermined pressure condition at the inlet. The valve arrangement is configured to provide fluid communication between the inlet and the outlet of the valve arrangement in response to an outlet pressure being greater than an inlet pressure.

The present invention further provides a valve arrangement including a body having an inlet and an outlet and a relief operator provided in the body. The valve arrangement is configured to provide fluid communication between the inlet and the outlet of the body in response to a predetermined pressure condition at the inlet. The relief operator is configured to provide fluid communication between the inlet and the outlet in response to an outlet pressure being greater than an inlet pressure.

The valve arrangement provides for pressure relief, and additionally, provides make-up fluid without the use of multiple valves and controls.

BRIEF DESCRIPTION OF THE DRAWINGS

The above-mentioned and other features of this invention, and the manner of attaining them, will become more apparent and the invention itself will be better understood by reference to the following description of the embodiments of the invention taken in conjunction with the accompanying drawings, wherein.

DETAILED DESCRIPTION

Reference will now be made in detail to the exemplary embodiments of the invention, an example of which is illustrated in the accompanying drawings. Wherever possible, the same reference numbers will be used throughout the drawings to refer to the same or like parts.

Figure 1:
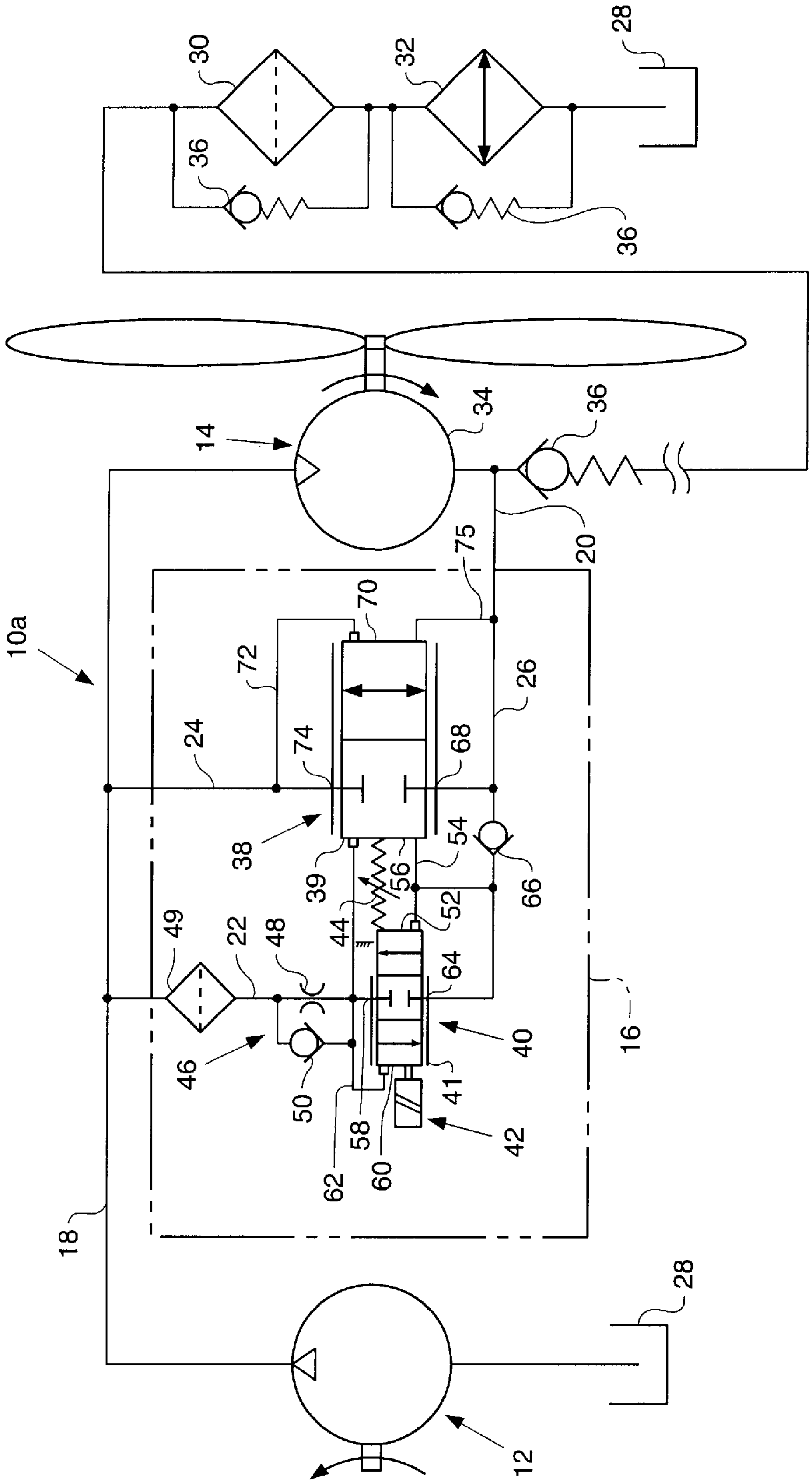
FIG. 1 is a schematic representation of a fluid system according to a first embodiment of the present invention including a valve arrangement co-acting with a pump and motor combination.

Referring to FIG. 1, a first embodiment of a fluid control system according to the present invention is shown and includes a pressure supply 12, such as a hydraulic pump, in fluid communication with a working device 14 through a supply line 18. The working; device may be a hydraulic motor, for example, or any other device urged to perform work by the pressure supply 12. The fluid control system 10*a* includes a valve arrangement 16 having an inlet 24 connected with the supply line 18 and an outlet 26 connected with a discharge line 20. The valve arrangement 16 also includes a signal line 22 which is connected with the supply line 18. Fluid is drawn from a reservoir 28 by the pressure supply 12 and delivered to the working device 14 through supply line 18. A filter 30 and cooler unit 32 are provided downstream of the working device 14 and respectively clean and cool the fluid returning to the fluid reservoir in preparation for the fluid to be re-introduced to the pressure supply. Check valves 36 are provided downstream of the working device 14 and upstream of the filter 30 and cooler unit 32 as is customary. The working device 14 may be a hydraulic fan motor 34, for example, however it is envisioned that other working devices may be utilized in accordance with the fluid control system 10*a*.

The valve arrangement 16 of the fluid control system 10*a* provides for pressure relief, selective unloading of fluid pressure and fluid make-up as described below in the "Industrial Applicability" section. Valve arrangement 16 includes a relief operator assembly 38 and a signal operator assembly 40. The relief operator assembly 38 may be, for example a two-position proportional valve and the signal operator assembly 40 may be a three-position valve, for example. The relief operator assemble 38 includes a relief operator 39 therein to, inter alia, relieve excessive fluid pressure established within the supply line 18. Signal operator assembly 40 includes a signal operator 41 therein to meter signal fluid pressure provided from the signal line 22.

The valve arrangement 16 further includes a solenoid 42 engagable with the signal operator 41. Selective activation of the solenoid 42 urges movement of the signal operator 41, and in turn, control of the signal fluid through the signal operator assembly 40. A biasing member 44 is provided between a first end 56 of the relief operator 39 and a first end 52 of the signal operator 41.

The signal line 22, which fluidly connects the supply line 18 with the signal operator assembly 40, includes a throttle assembly 46. The throttle assembly 46 includes an orifice 48 and a check valve 50 which co-act to allow signal pressure to the signal operator assembly 40. Supply line 22 also includes a filter 49 upstream of the throttle assembly 46 to prevent debris from entering the throttle assembly 46, and thereafter, the signal operator assembly 40. The first end 56 of the relief operator 39 is in fluid communication with first end 52 of the signal operator 41 through the fluid passage 54. The passage 54 is fluidly connected with the discharge line 20.

The signal operator assembly 40 includes an inlet port 58 and an outlet port 64. The inlet port 58 is in fluid communication with a second end 60 of the signal operator assembly 40 through a passage 62. A check valve assembly 66 is provided in the discharge line 20 and is arranged to allow the signal fluid from the operator assembly 40 to discharge into the discharge line 20. However, the check valve assembly 66 prevents the fluid from back flowing through the discharge line 20 in a direction toward the outlet port 64 of the signal operator assembly 40.

The relief operator assembly 38 includes an outlet port 68 and an inlet port 74. The inlet port 74 is fluidly connected to the supply line 18 through the inlet 24 and the outlet port 68 is directly connected to the discharge line 20. The relief operator 39 includes a second end 70 in fluid communication with the inlet port 74 through a passage 72. Further, the second end 70 of the relief operator 39 is in fluid communication with the discharge line 20 through passage 75.

Figure 2:
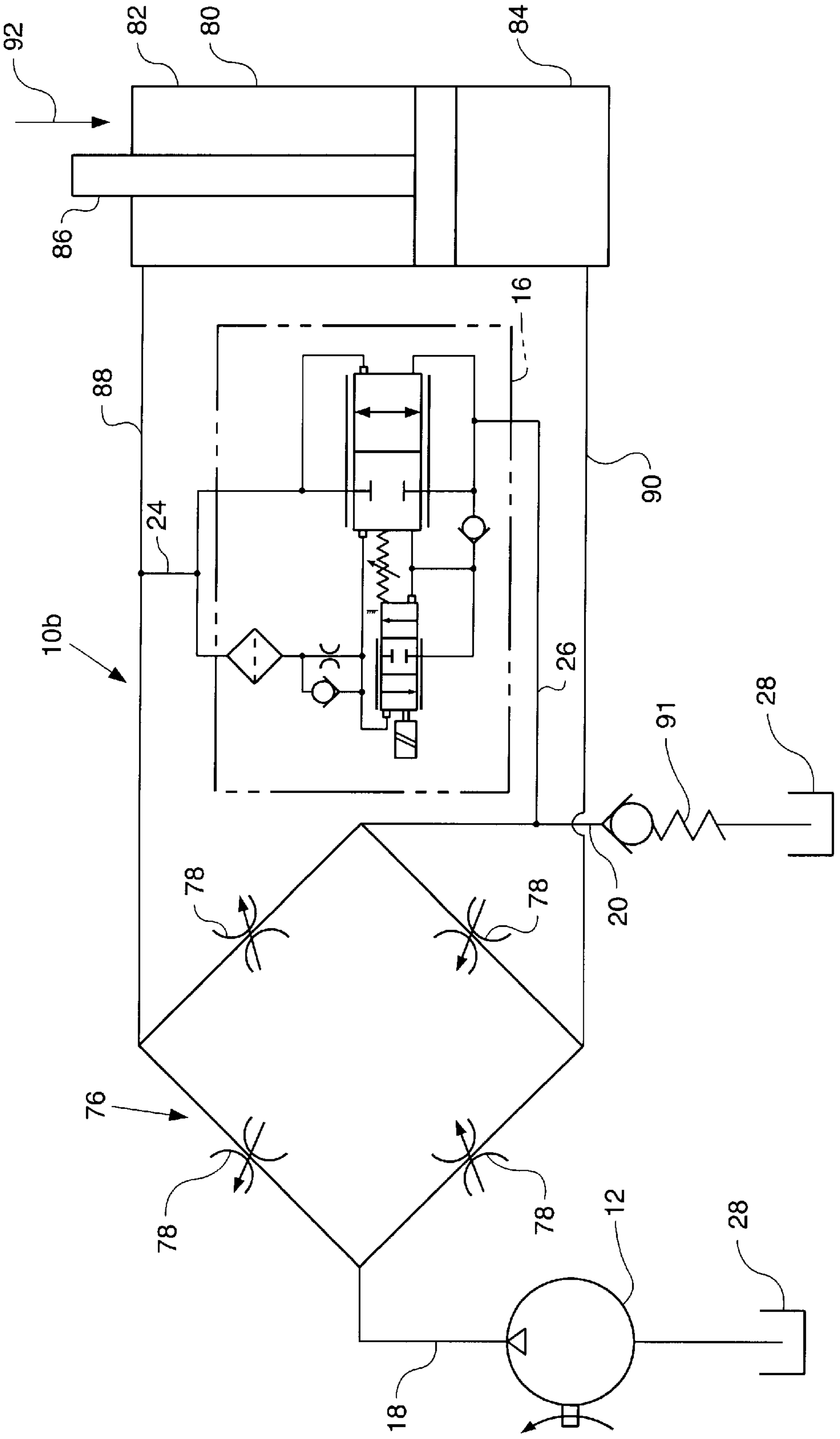
FIG. 2 is a schematic representation of a fluid system according to a second embodiment of the present invention including the valve arrangement co-acting with a directional valve arrangement and an actuator.

Referring to FIG. 2, shown is a second embodiment of a fluid control system according to the present invention. Fluid control system **10*b* includes an actuator 80 fluidly connected to a directional control valve arrangement 76. The directional control valve arrangement 76 may include a three-position spool valve or four independent metering valves 78, for example. Metering valves 78 are connected to the pressure supply 12, the fluid reservoir 28 and the actuator, as is customary. A rod end 82 and a head end 84 of the actuator 80 are respectively attached to the valve arrangement 76 through a rod end line 88 and a head end line 90. A biased check-valve 91 is provided within the discharge line 20. The valve arrangement 16 includes the inlet 24 connected with the rod end line 88 and the outlet 26 connected with the discharge line 20. Arrow 92 indicates an exemplary direction of a piston 86 of the actuator 80 when, for example, the piston is loaded and is being rapidly lowered. Notably, the valve arrangement 16 of the fluid control system 10*a* (FIG. 1) is substantially identical to the fluid control system 10*b* (FIG. 2**).

Figure 3:
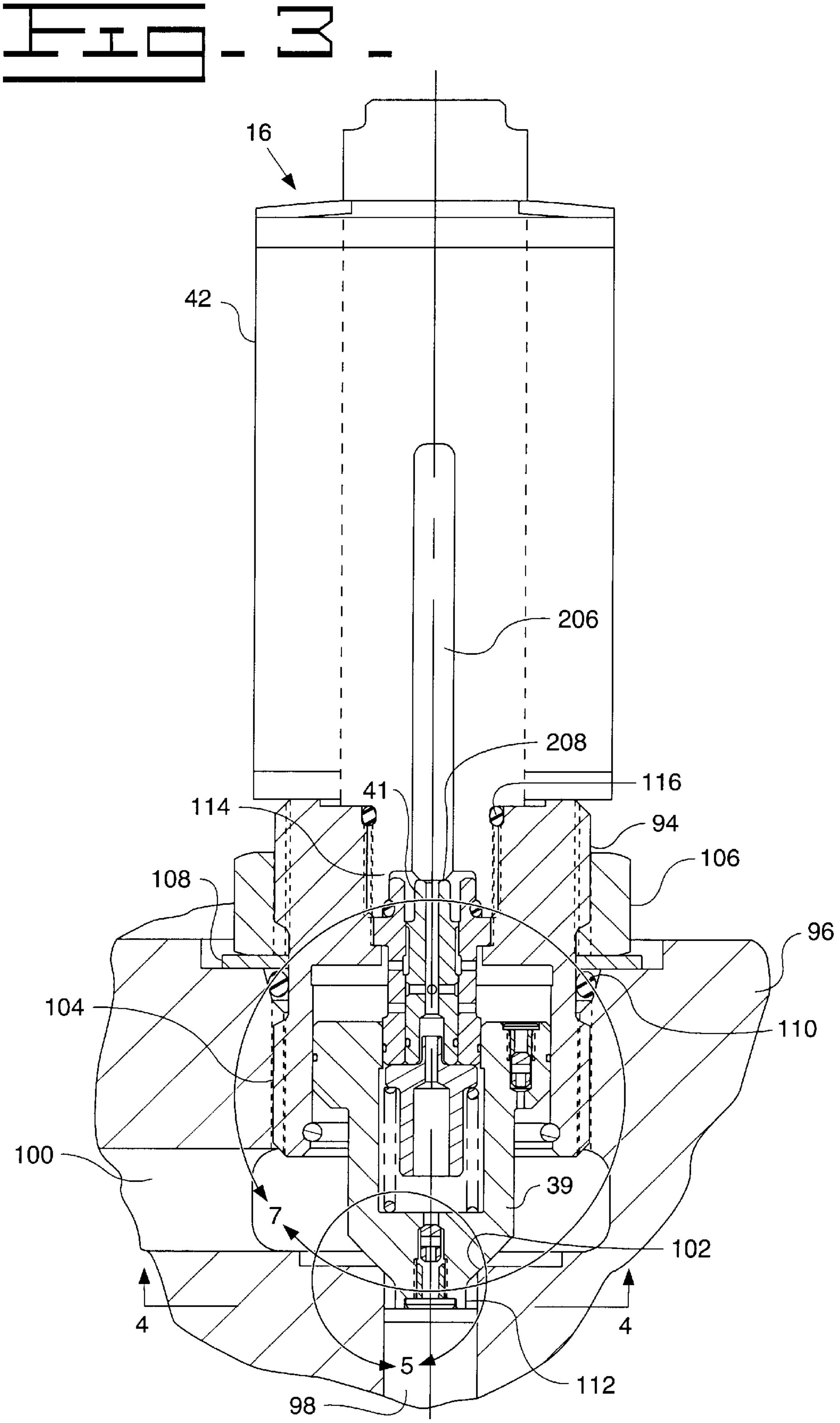
FIG. 3 is a cross-sectional view of the valve arrangement of FIGS. 1 and 2.

Referring to FIG. 3, shown is an exemplary construction of the valve arrangement 16 according to the present invention including a base member 94 in threaded engagement with a receiving body 96, which may include a hydraulic motor housing, for example. Within the receiving body 96 are an inlet port 98 and an outlet port 100. The inlet and outlet ports 98, 100 are fluidly connected to the supply and discharge lines 18, 20 respectively (FIG. 1). The relief operator 39 is a poppet-type element having a nose portion 112 sealably engaged with a seat 102 provided within the receiving body 96. The base member 94 of the valve arrangement 16 adjustably mounts to the receiving body 96 through a threaded engagement 104. Upon positioning of the valve arrangement 16, nut 106 is cinched against washer 108 to lock the arrangement into position. An O-ring 110 is provided to sealably engage the base member 94 with the receiving body 96. As best seen in FIG. 3, solenoid 42 includes an adapter portion 114 in threaded engagement with the base member 94. An O-ring 116 seals the engagement between the adapter portion 114 of the solenoid 42 and the receiving body 96.

Figure 7:
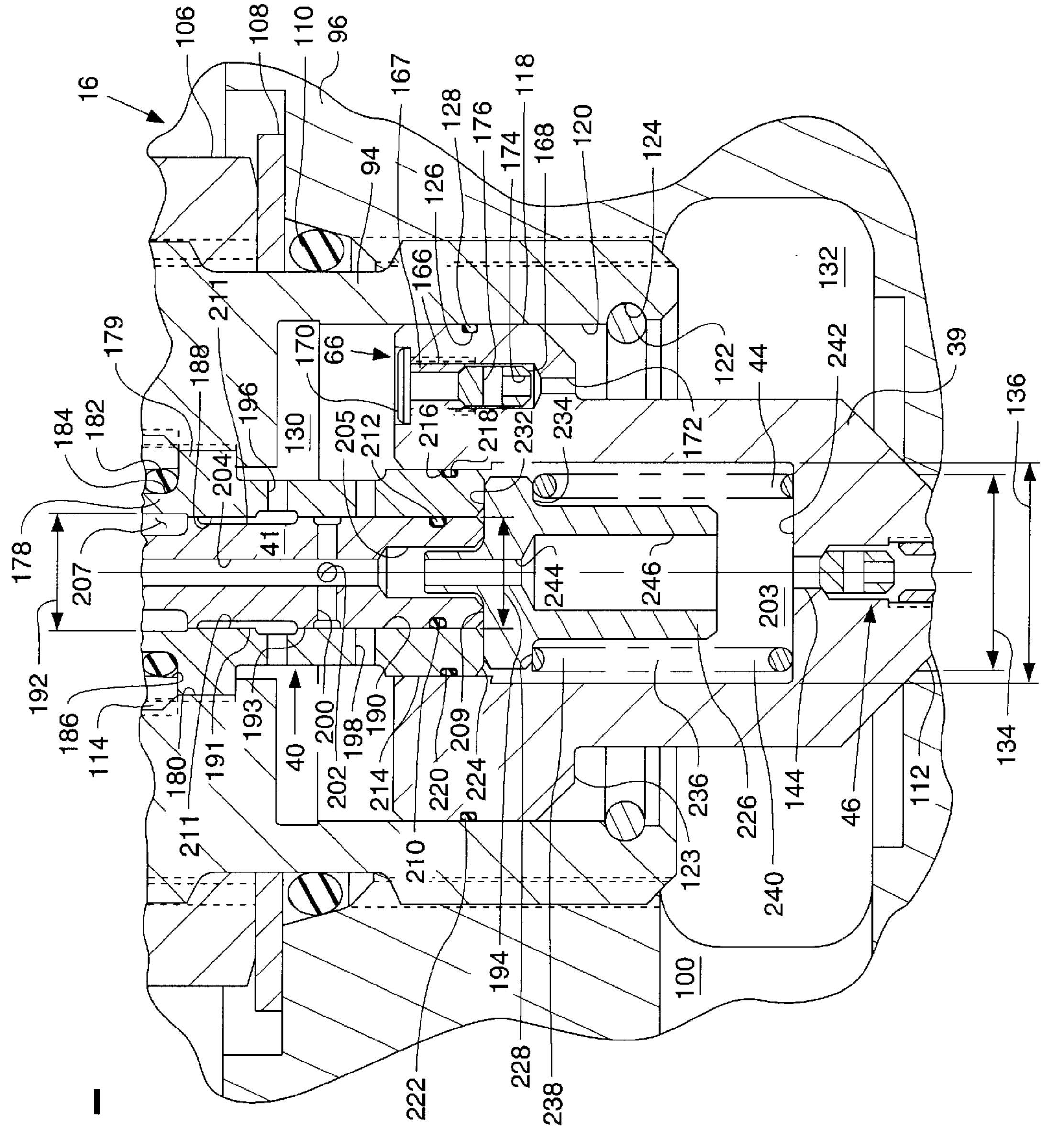
FIG. 7 is an enlarged partial view of the encircled area 7—7 of the valve arrangement of FIG. 3.

Referring to FIG. 7, the relief operator 39 of the valve arrangement 16 includes an outer guide surface 118 moveable within a guide surface 120 of the base member 94. A retaining ring 122 is provided within the guide surface 120 to act as a stop as a portion of a stepped surface 123 of the relief operator 39 contacts the retaining ring 122. When the valve arrangement 16 is removed from the receiving body 96 the retaining ring 122 prevents the relief operator 39 from separating from the base member 94. Retaining ring 122 may be a snap-ring for example, which engages the groove 124 formed within the surface 120. It may be seen that a groove 126 is formed within a circumference of the outer guide surface 118 of the relief operator 39 and receives an O-ring 128 provided therein. The O-ring 128 provides a sealing engagement between the relief operator 39 and the base member 94. An annular control chamber 130 is formed between the relief operator 39 and the base member 94. Further, positioned between the inlet port 98 and the outlet port 100 within the receiving body 96 is a downstream cavity 132. The relief operator 39 is structured to be hydraulically balanced by providing a nose area 134 of the nose 112 of the relief operator 39 to be substantially similar with a backside area 136 of the relief operator 39. In fact, it is advantageous to construct the backside area 136 to be slightly larger (within 3%) of the nose area 134 of the relief operator 39 so that the relief operator 39 is biased toward a closed position by the supply pressure.

Figure 5:
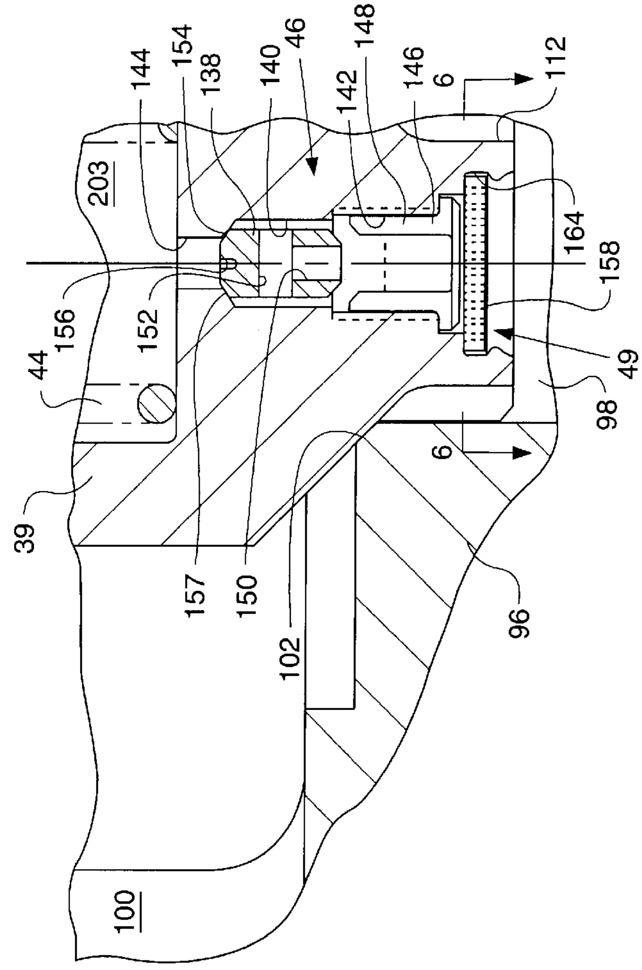
FIG. 5 is an enlarged partial view of the encircled area 5—5 of the valve arrangement of FIG. 3 showing the relief operator seated within a receiving body.

Referring to FIG. 5, the throttle assembly 46 of the valve arrangement 16 is provided within the nose 112 of the relief operator 39 to divert at least a portion of the supply pressure through the throttle assembly 46 to form the signal pressure. The throttle assembly 46 includes a throttle pin 138 provided in a first bore 140 of the relief operator 39 and a pin retainer 146 is provided within a second bore 142 of the relief operator 39 to retain the throttle pin 138 within the first bore 140. A through bore 144 is provided within the relief operator 39 in order for the signal pressure to pass from the nose 112 to a spring chamber 203 provided within the relief operator 39. The pin retainer 146 includes axially extended ribs 148, forming a cradle to suitably retain the throttle pin 138. The cradle structure of the retainer 146 provides for a small amount of fluid to flow backwards through the nose 112 to purge any debris which may have accumulated within the throttle assembly 46. The throttle pin 138 includes an axial bore 150 and a radial bore 152 to further allow a small backflow of fluid to move through the nose 112 in order to clean an end 154 of the throttle pin. The end 154 of the throttle pin 138 is provided with radially extended grooves 156, such as four equidistantly spaced apart grooves, for example, to allow signal fluid to bleed past the engagement between the throttle pin 138 and a seat 157 formed in the relief operator 39. The grooves 156 provide the function of the orifice 48, as is best shown in FIG. 1.

Figure 6:
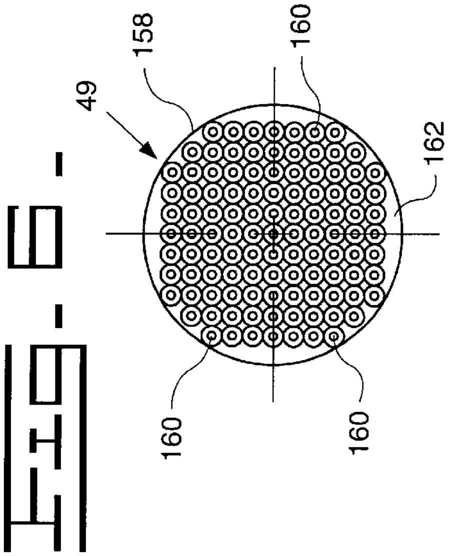
FIG. 6 is a cross-sectional view of the valve arrangement of FIG. 3 taken along line 6—6 of FIG. 5 showing a filter disk.

Referring to FIGS. 5 and 6, the filter 49 (FIG. 1) of the valve arrangement 16 (FIG. 5) may be a screen 158, for example, provided upstream of the throttle assembly 46 to prevent larger debris from entering and impairing proper operation of the throttle assembly 46. The screen 158 includes a plurality of countersunk holes 160, each having, for example, a through hole diameter of 0.2 mm and a counterbore diameter of 0.4 mm. As best seen in FIG. 5, screen 158 includes an outer periphery 162 which is retained within a retaining groove 164 within the nose 112 of the relief operator 39.

Referring to FIG. 7, shown is the check valve assembly 66 (FIG. 1), which allows fluid from the control chamber 130 to enter the downstream cavity 132 through hole 172, yet prevents fluid from the downstream cavity 132 from entering the control chamber 130. The check valve assembly 66 includes a check pin 168, having axial and radial bores 174, 176 respectively, and a pin retainer 170 to capture pin 168 within the relief operator 39. Notably, check pin 168 includes a nose portion 166 which engages with a seat 167 on retainer 170 to block flow through the check valve assembly 66 when pressure in the downstream cavity 132 is greater than the pressure in the control chamber 130.

Figure 4:
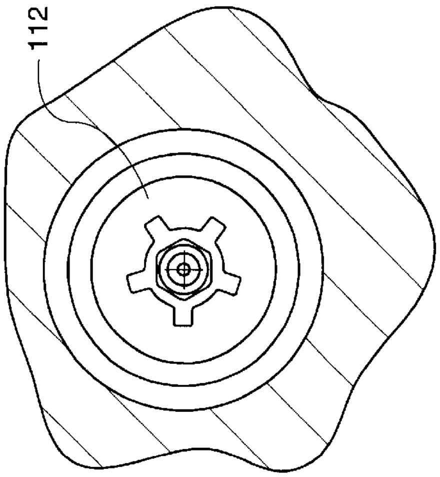
FIG. 4 is a cross-sectional view of the valve arrangement of FIG. 3 along line 4—4, showing the signal input portion of the relief operator.

As best seen in FIG. 7, the signal operator assembly 40 of the valve arrangement 16 includes the signal operator 41 slideable within a stationary guide member 178. The guide member 178 includes a flanged portion 179 threadably engaged within a bore 180 of the base member 94. The guide member 178 includes a groove 184 having a seal therein. The seal 182 is provided between the groove 184 and a bore 186 within the adapter portion 114 of solenoid 42 to seal the operator guide 178 and the base member 94 (FIG. 4).

The guide member 178 includes a first bore 188 and a second bore 190 which respectively engage first and second guide surfaces 191, 193 of the signal operator 41. The first and second bores 188, 190 of the signal operator guide 178 respectively define first and second areas 192, 194. The area 192 is slightly larger than area 194 (within 3% for example) so that the signal operator includes a slight pressure induced bias toward the solenoid 42 in the fluid make-up mode as is described below.

The guide member 178 also includes a first radial through bore 196 and a second radial through bore 198. Accordingly, the signal operator 41 includes a pair of intersecting radial through bores 200, 202 provided to relieve signal pressure, contained within the spring chamber 203 of the relief operator 39. The pressure within the spring chamber 203 is directed to the control chamber 130 through the bores 200, 202 as they align with bore 198 of the guide member 178. Hence, movement of the signal operator 41, toward the nose 112 of the relief operator 39 will eventually result in pressure from the spring chamber 203 being relieved to the control chamber 130 through bores 200, 202 of the signal operator 41.

As best seen in FIG. 7, the signal operator 41 includes a pair of axially positioned notches 211 in a periphery of the signal operator 41. It will be understood that a pathway, for relief of the fluid pressure within control chamber 130, is provided by the axial notches 211 opening into a signal operator chamber 207 as the signal operator 41 is urged toward the solenoid 42.

Further, the signal operator 41 includes an axially extending through bore 204 (FIGS. 3–7) and a counterbore 205 to provide fluid communication between the spring chamber 203 and the signal operator chamber 207 in order to pressure balance the signal operator 41. As best seen in FIG. 3, solenoid 42 includes a pin 206 which contacts, and is in tracking engagement with, an end 208 of the signal operator 41.

Referring again to FIG. 7, the signal operator 41 includes an end 209 which has a groove 210 on a periphery thereof. An O-ring 212 is provided in the groove 210 and seals against the bore 190 of the signal operator guide 178. It may be seen that the guide member 178, not only provides a guide for the axially moveable signal operator 41, it too provides an axial guide surface 214 for the relief operator 39. Specifically, the relief operator 39 includes a contact surface 218 on an inner bore 216 thereof which, is slidingly engaged with the guide surface 214 of guide member 178. The guide member 178 includes a peripherally positioned groove 220 and an O-ring 222 provided therein so that the relief operator 39 is in sealed engagement with the guide member 178. The guide member 178 includes a butt end 224, which acts as a stop for a spring retainer 226. The spring retainer 226 includes a flanged end 228 having a first surface 232 that engages the end 224 of the guide member 178 and a second surface 234 that engages the biasing member or spring 44. The spring 44 includes a first end 238 in contact with the surface 234 of the retainer 226 and a second end 240 in contact with a floor 242 of the spring chamber 203. It will be understood that the signal pressure is transmitted through the spring retainer 226 through a passage formed by the axially positioned hole 244 and counterbore 246 within the retainer 226.

Industrial Applicability

Referring to FIGS. 1 and 7, the operation of the fluid control system 10*a* will be described. In general, the pressure supply 12 urges pressurized fluid toward the working device 14 through supply line 18. The valve arrangement 16 is positioned in a bypass or parallel configuration relative to the pressure supply 12. A portion of the supply pressure may be controllably diverted from the pressure supply to the fluid reservoir through the valve arrangement 16 to control, with variability, the work output of the working device 14. For example, the pressure supply 12 may be a pump and the working device 14 may be a hydraulic motor and the valve arrangement 16 may be used to control the speed of the motor driving an engine-cooling fan.

The pressure supply 12 is also connected to the signal line 22 in addition to being connected to the inlet 24 of the valve arrangement 16 and the working device 14. The portion of the pressure supply introduced into the signal line 22 first acts on the end 60 of the signal operator 41 and on the end 56 of the relief operator 39 after the fluid travels through the filter 49 and the throttle assembly 46. The fluid from the throttle assembly 46 is also directed into the inlet port 58 of the signal operator assembly 40. The supply pressure acts on the end 70 of the relief operator 39 and is directed through the relief operator assembly 38 via the inlet port 74 when the relief operator 39 is shifted to an open position (not shown). The relief operator 39 is in a normally closed position when the solenoid is not activated.

Corresponding to the valve arrangement 16 being in a pressure relief mode, end 70 of the relief operator 39 is exposed to a predetermined pressure above an acceptable operating pressure. Fluid pressure is delayed in passing the orifice 48 of the throttle assembly and the pressure on end 56 of the relief operator 39 is significantly less than the pressure on the end 70 of the relief operator 39. As a result, the relief operator 39 is urged to unseat or open. Notably, the relief mode is triggered at pressures above acceptable operating pressures and is independent of the selective control of the valve arrangement 16.

In a pressure-unloading or modulating mode, the pin 206 (FIG. 3) of the solenoid 42 is selectively extended, causing the signal operator 41 to move such that crossbores 200, 202 of the signal operator 41 align with the second crossbore 198 within the guide 178 (FIG. 7). As a result, pressure is relieved from the spring chamber 203 of the signal operator assembly 40 which, in turn, causes pressure on the end 56 of the relief operator 39 to be relieved. Consequently, the relief operator 39 shifts to the unseated or open position and pressure within the supply line 18 is directed to the reservoir 28 through the relief operator assembly 40.

A fluid make-up mode is triggered when the pressure in the supply line 18 drops below the pressure within the discharge line 20. This situation may occur as a result of a sudden loss of the supply pressure 12 and, as a result, an inlet of the working device 14 may be subject to cavitation. In response, make-up fluid is directed from the discharge line 20 to the supply line 18 to cease cavitation occurring at the inlet of the working device 14 (FIG. 1). Once the pressure within the supply line 18 (FIG. 1) falls below the pressure within the discharge line 20 (FIG. 1), the pressure within the signal line 22 also deteriorates accordingly with the supply pressure. Accordingly, the pressure within the control chamber 130 is trapped and the relief operator 39 is prevented from unseating since the check valve assembly is positioned to prevent fluid communication between the downstream cavity 132 and the control chamber 130. However, the trapped pressure within the control chamber 130 acts on the pressure areas 192, 194 through the first crossbore 196 within the guide 178.

Since the pressure area 192 is slightly larger relative to the pressure area 194, a net force is imparted on the signal operator 41 in the direction of the solenoid 42 causing the signal operator 41 to move toward the solenoid 42. The signal operator 41 continues to move until the pressure within the control chamber 130 is relieved to the supply line 18 through the axial notches 211 (FIG. 7) within the signal operator 41. Specifically, the fluid pressure being relieved from the control chamber 130 passes through the first crossbore 196 within the guide 178, into the notches 211 within the signal operator 41, into the signal operator chamber 207, through the axial bore 204 within the signal operator through the retainer 226 and finally through the check valve arrangement 46 within the nose 112 of the relief operator 39. Thereafter, the fluid pressure within the downstream cavity 132 acts on the stepped surface 123 of the relief operator 39 causing the relief operator 39 to open or unseat. Once unseated, the relief operator 39 allows make-up fluid within the downstream cavity 132 to flow into the supply line 18 to prevent or substantially subdue cavitation of the working device 14. Once the pressure within the control chamber 130 is relieved the pressure within the downstream cavity 132 acting on the stepped surface 123 of the relief operator 39 urges movement of the relief operator 39 and fluid is restored to the supply line 18 from the discharge line 20. It will be understood that since both the relief operator 39 and the signal operator 41 are substantially balanced, the valve arrangement 16 is suitable for varying operating pressures.

The valve arrangement 16 includes a spring 44 that provides an infinitely variable force since the signal operator 41 and the relief operator 39 are connected through the spring 44 and the signal operator may be modulated to select the desired spring force. Consequently, the position of the signal operator 41 may be selected to unseat the relief operator 39 pursuant to significant operating pressure conditions, or contrarily, pursuant to light or moderate operating conditions. Moreover, since the signal operator 41 is positionable via the electronic solenoid 42, the relief, unloading and make-up features of the valve arrangement 16 may be activated manually or automatically pursuant to computer or microprocessor control through feedback circuitry, or as is customary.

Referring to FIG. 2, the operation of the second embodiment of a fluid control system will be described. Upon movement of the piston 86 (which is typically rapid during a load drop, for example) in the direction of arrow 92, the actuator 80 may be prone to cavitation. However, the valve assembly 16 provides make-up fluid to the rod end 82 of the actuator 80 when the rod end 82 of the actuator 80 drops below a predetermined reservoir pressure. Similar to the fluid make up mode previously described for the fluid control system 10*a* (FIG. 1), the valve arrangement 16 includes a signal operator 41 that responds by relieving control chamber 130 such that the outlet pressure urges the relief operator 39 off of its seat and make-up fluid is supplied to the rod end 82 of the actuator 80.

It is intended that the specification and examples be considered as exemplary only, with a true scope and spirit of the invention being indicated by the following claims.

What is claimed is:

1. A fluid control system comprising:

a pressure supply;

a valve arrangement including an inlet and an outlet and being in fluid communication with said pressure supply, said valve arrangement comprising:

an electric activation member;

a relief operator being operatively coupled with said electric activation member and being configured to provide fluid communication between said inlet and said outlet of said valve arrangement in response to an inlet pressure at said inlet exceeding a threshold pressure, said threshold pressure being selectively adjustable via selective activation of said electric activation member;

said valve arrangement being configured to provide fluid communication between said inlet and said outlet of said valve arrangement in response to an outlet pressure at said outlet being greater than an inlet pressure at said inlet.

2. The fluid control system of claim 1, wherein said valve arrangement further comprises a signal operator disposed in fluid communication with said relief operator and a control chamber disposed in fluid communication with said signal operator, said signal operator is configured to selectively discharge fluid from said control chamber to cause said fluid communication between said inlet and said outlet.

3. The fluid control system of claim 2, wherein said signal operator is moveably engaged by said electric activation member.

4. The fluid control system of claim 2, wherein said valve arrangement further includes a signal line in fluid communication with said signal operator, said signal operator is configured to relieve a pressure condition of said control chamber through said signal operator.

5. The fluid control system of claim 4, wherein said pressure condition relieved through said signal operator is directed toward said signal line during a fluid make-up mode.

6. The fluid control system of claim 4, wherein said pressure condition relieved through said signal operator is selectively directed toward a discharge line during a modulation mode.

7. The fluid control system of claim 1, wherein said pressure supply is hydraulically connected to an output device and said valve arrangement is configured in a bypass position relative said output device.

8. The fluid control system of claim 7, wherein said output device is a hydraulic motor.

9. The fluid control system of claim 7, wherein said output device is a piston cylinder arrangement.

10. The fluid control system of claim 1, wherein said electric activation member is a solenoid.

11. A valve assembly comprising:

an electric activation member;

a body having an inlet and an outlet;

a relief operator operatively coupled with said electric activation member and being disposed in said body, the relief operator being configured to provide fluid communication between said inlet and said outlet of said body in response to an inlet pressure at said inlet exceeding a threshold pressure, said threshold pressure being selectively adjustable via selective activation of said electric activation member;

said relief operator being configured to provide fluid communication between said inlet and said outlet in response to an outlet pressure at said outlet being greater than an inlet pressure at said inlet.

12. The valve assembly of claim 11 further comprising a signal operator and a control chamber defined in said body, said signal operator being in fluid communication with said relief operator through said control chamber.

13. The valve assembly of claim 12, further including a biasing member engaged with said relief operator and said signal operator, a biasing force being imparted on said relief operator through said biasing member, said biasing force being varied in response to selective movement of said signal operator.

14. The valve assembly of claim 13, wherein said threshold pressure is selectively adjustable via selective movement of said signal operator.

15. The valve assembly of claim 13, wherein said signal operator is operatively coupled with said electric activation member and is movable in response to activation of said electric activation member.

16. The valve assembly of claim 13, wherein said biasing member is compressed between said signal operator and said relief operator.

17. The valve assembly of claim 12 wherein said relief operator is urged to open in response to selective movement of said signal operator.

18. The valve arrangement of claim 12, wherein movement of said signal operator causes pressure relief of said control chamber and fluid communication between said inlet and said outlet.

19. The valve arrangement of claim 12, wherein said signal operator is in fluid communication with a signal pressure provided by a supply pressure, said signal pressure being directed through said relief operator.

20. The valve arrangement of claim 12 further comprising a check valve positioned between said outlet and said control chamber, said check valve being configured to prevent a fluid flow communication between said control chamber and said output corresponding to a pressure condition of said outlet being greater than a pressure condition of said inlet.

21. The valve assembly of claim 11, wherein said electric activation member is a solenoid.

22. A fluid control system comprising:

a pressure supply;

a valve arrangement including an inlet and an outlet and being in fluid communication with said pressure supply, said valve arrangement comprising:

a relief operator being configured to provide fluid communication between said inlet and said outlet of said valve arrangement in response to a predetermined pressure condition at said inlet;

a signal operator and a control chamber, said signal operator is configured to selectively discharge fluid from said control chamber to cause said fluid communication between said inlet and said outlet; and a signal line in fluid communication with said signal operator, said signal operator is configured to relieve a pressure condition of said control chamber through said signal operator, said pressure condition relieved through said signal operator is directed toward said signal line during a fluid make-up mode;

said valve arrangement being configured to provide fluid communication between said inlet and said outlet of said valve arrangement in response to an outlet pressure at said outlet being greater than an inlet pressure at said inlet.

* * * * *